(12) United States Patent
Li et al.

(10) Patent No.: US 9,234,567 B2
(45) Date of Patent: Jan. 12, 2016

(54) GEAR CHANGE TRANSMISSION HAVING AXIALLY ADJUSTING COUNTERSHAFTS

(76) Inventors: Jianwen Li, Vaughan (CA); Peiling Dou, Vaughan (CA); Junyi Jesse Li, Vaughan (CA)

( * ) Notice: Subject to any disclaimer, the term of this patent is extended or adjusted under 35 U.S.C. 154(b) by 0 days.

(21) Appl. No.: 13/569,423

(22) Filed: Aug. 8, 2012

(65) Prior Publication Data

US 2013/0042709 A1    Feb. 21, 2013

Related U.S. Application Data

(60) Provisional application No. 61/525,361, filed on Aug. 19, 2011.

(51) Int. Cl.
*F16H 3/08* (2006.01)
*F16H 3/095* (2006.01)
*F16H 37/04* (2006.01)

(52) U.S. Cl.
CPC .............. *F16H 3/095* (2013.01); *F16H 37/043* (2013.01); *F16H 2200/0052* (2013.01); *F16H 2200/0078* (2013.01)

(58) Field of Classification Search
USPC ..................... 74/331, 344, 357, 361, 363, 410
See application file for complete search history.

(56) References Cited

U.S. PATENT DOCUMENTS

| | | | | |
|---|---|---|---|---|
| 3,338,109 A | * | 8/1967 | Forsyth et al. ................... | 74/410 |
| 3,611,823 A | | 10/1971 | Richards | |
| 3,772,934 A | * | 11/1973 | Warren ............................ | 74/410 |
| 4,442,728 A | * | 4/1984 | Jahnel ............................. | 74/361 |
| 4,640,145 A | | 2/1987 | Vandervoort | |
| 4,709,590 A | | 12/1987 | Richards | |
| 4,807,493 A | | 2/1989 | Loeffler | |
| 4,869,122 A | * | 9/1989 | Inui et al. ........................ | 74/331 |
| 5,927,147 A | * | 7/1999 | Morrow .......................... | 74/410 |
| 6,073,506 A | | 6/2000 | Wireman | |
| 6,364,611 B1 | * | 4/2002 | Matsuda et al. .......... | 416/170 R |
| 6,374,689 B1 | | 4/2002 | Morrow | |

* cited by examiner

*Primary Examiner* — Ha D Ho
(74) *Attorney, Agent, or Firm* — Daniel Baudwin, Esq.; Global Intellectual Property Agency, LLC

(57) ABSTRACT

A change-gear transmission having an input shaft, a main shaft having at least one main shaft gear, a plurality of countershafts spanning between the input shaft and main shaft gear, and gear synchronizers between selectable gears. The bore of main shaft gears have a minimal radial clearance fit with its mating parts to prevent gear synchronizer wear, while the meshing between the input shaft gears and countershaft gears is equally distributed using a means to equalize the torque transfer between countershafts. The countershafts are rotatably supported and displace axially between bearing or bushing supports, while the meshed gears comprise a helical gear tooth arrangement to create axial load on the countershaft if excessive and uneven load is sensed in one countershaft over another. This presents a new and unique countershaft meshing design that allows multiple countershafts to achieve equal load sharing while permitting gear synchronizers use on the main shaft.

9 Claims, 11 Drawing Sheets

GEAR CHANGE TRANSMISSION HAVING AXIALLY ADJUSTING COUNTERSHAFTS

CROSS REFERENCE TO RELATED APPLICATION

This application claims the benefit of U.S. Provisional Application No. 61/525,361 filed on Aug. 19, 2011, entitled "Multiple Countershaft Transmission With Axial Floating Self-Adaption and Sharing Load." The above identified patent application is herein incorporated by reference in its entirety to provide continuity of disclosure.

BACKGROUND OF THE INVENTION

1. Field of the Invention

The present invention relates to transmission assemblies, gear change devices and dynamic components utilized for transferring power and torque. More specifically, the present invention pertains to an improved transmission assembly that utilizes a plurality of axially floating countershafts that adjust to equally accept input load for preventing excessive wear, improving component lifespan and reducing potential harmonics due to unequal load-sharing between transmission countershaft members. The present invention further provides equal load-share while incorporating gear change synchronizers to facilitate smooth gear changes while preventing excessive wearing of these components due to radial positioning mismatch or slack.

Automotive and other vehicle transmissions are well known for transmitting and transforming input power from a rotary power source into one that is suitable for desired output, whether driving the wheels of the vehicle or operating a mechanical component in a manufacturing process. The goal is generally to create an efficient and reliable dynamic assembly that can accept considerable loads without occupying undue space, consuming energy or reducing the effectiveness of the overall process. To effectively transmit high levels torque, most transmissions utilize intermediate shafts to split the torque into different paths using smaller elements, which permit designers to reduce the overall size of the individual components over a design utilizing a single transmission pathway subjected to the entirety of the torque input load. By splitting the torque, the structural requirements of the components are reduced, where otherwise a single shaft would require significant load carrying capacity for the same end goal. The use of several countershafts, in particular, splits the load between several gear components and intermediate shafts, which increases the number of components in the assembly but can significantly reduce their individual size. Thus efficient placement and spacing of components allows the overall transmission to be reduced in size when compared to the size requirements of larger transmission components using fewer or no load splits.

The primary concern related to separating a transmission input load and distributing it to several intermediate elements is the potential for imbalanced load transfer and uneven contact between meshed gear sets. A perfectly meshed set of components can be designed, but the reality of design tolerances and manufacturing and assembly considerations inevitably leads to mismatches in contact between these components, which are further exacerbated by their dynamic nature. Unequal contact and unequal load share can result in excessive wear, reduced component life, premature failure of the system and harmonics that threaten the operation of the transmission. Uneven wear and complete failure from this unequal load share creates an obstacle to efficiently separating input load into intermediaries without compromising longevity.

The present invention is provided as an improved transmission assembly having countershafts that are capable of utilizing gear synchronizers and further for allowing equal distribution of load between an input shaft and a plurality of countershafts. Most conventional twin and multiple countershaft transmissions achieve equal load sharing between countershafts by allowing free radial movement of main shaft and main shaft gears to account for the imbalance. There are a lot of advantages to this design and it has been shown to be highly effective and widely implemented for vehicle transmission assemblies; however the main drawback to this design is the inability to utilize gear synchronizers, as the radial movement of the gears causes nonuniform contact and increased friction between the synchronizer ring and the cone surface of the main shaft gears when shifting. This friction results in reduced reliability and useful life of the synchronizer, as the friction rapidly creates wear and premature failure. It will be appreciated then that the ability to utilize synchronizers in a transmission having radially floating members precluded, and therefore the overall shifting quality is reduced for the user during gear transitions.

Specifically, the present invention provides a transmission having a plurality of countershafts that are fixed radially and allowed to float axially to account for torque mismatch between complementary countershafts when countershaft gears are in contact with main shaft gear. The countershafts are adapted to displace axially in either direction to account for uneven load transfer, wherein the countershaft gears are helical gears having the same helix hand. When shifting to one gear, the constant gear and ongoing engaged gear on countershaft will automatically self-adapt or self-adjust while balancing any axial load imbalance between the countershafts. The constant gear set and ongoing engaged gear set will then mesh each other to achieve equal load sharing, as the helical gear teeth transform the torque into an axial load, which is balanced between the set of countershafts.

2. Description of the Prior Art

Many transmission systems and gear change mechanisms have been disclosed in the prior art that relate to equal load share between transmission countershaft and main shaft members. These include devices that have been patented and published in patent application publications, and generally relate to radially floating members or designs that include a balancing means. The forgoing is a list of devices deemed most relevant to the present disclosure, which are herein described for the purposes of highlighting and differentiating the unique aspects of the present invention, and further highlighting the drawbacks existing in the prior art.

Specifically, U.S. Pat. No. 4,640,145 to Vandervoort discloses a multiple countershaft transmission assembly that is designed to reduce to the overall noise signature of the device during operation, as a gear tooth meshing and surface contact noises is mitigated through its unique design. Specifically, the assembly comprises a gear change transmission having multiple countershaft assemblies, wherein an input gear is constantly engaged with a countershaft gear. The input gear is provided having a gear tooth pitch that is not evenly divisible by the number of countershafts, whereby there is a time interval between gear meshing between the input and countershaft to reduce noise generation. The contact noise is not amplified but rather offset between countershafts. The Vandervoort transmission assembly, while providing a unique, lower noise transmission does not include synchronizer and a means of offsetting countershaft engagement with respect to an input shaft to reduce overall input and output shaft displacement, as provided for in the present invention.

Another such device is U.S. Pat. No. 4,807,493 to Loeffler, which discloses a twin countershaft transmission assembly having a floating main shaft having no internal or external bearings or other support device near its adjacent ends, whereby the main shaft is supported by a gears carrying the torque thereto. This arrangement provides a true torque split between countershafts, as the main shaft is able to accommodate relative movement between the shafts by not being constrained by a bearing or support device. The Loeffler device discloses a transmission having a self-aligning main shaft, while the present invention provides an even torque split and reduced component wear by allowing lateral displacement of the countershafts along their length to accommodate relative input and output shaft movement.

U.S. Pat. No. 3,611,823 to Richards discloses a similarly designed transmission assembly as that of Loeffler, wherein a transmission having a floating input or main drive gear is provided that freely displaces in an axial direction relative to both the input shaft and to the transmission main shaft. A coupling member linking the input shaft and the input gear permits axial rocking movement of the input gear relative to the input shaft to maintain alignment and identically rotate countershafts at substantially identical speeds. The Richards device, similar to the Loeffler device, fails to disclose axially adjusting countershafts that accept input from the input shaft without creating stress concentrations, binding, or other wearing situations otherwise created when the input and output shaft displace radially and unequally distribute torque to the countershafts. The present invention provides an axially adjusting set of countershafts to maintain even contact between the input and all meshed countershafts within the transmission assembly.

U.S. Pat. No. 6,073,506 to Wireman discloses a multiple countershaft transmission that includes at least two countershafts having sufficient gear tooth backlash such that the countershafts not presently transmitting drive torque due to minor assembly imperfections do not to impede substantially equal load-sharing of those countershafts transmitting drive torque. In this way, the Wireman device includes a means of maintaining equal load-sharing between countershafts in spite of assembly and manufacturing imperfections that cause unequal contacts within the transmission assembly. The backlash provides sufficient clearance for imperfections between a plurality of meshed gears, which are inevitably unequally in their contact between meshed pairs and lead to unequal torque distribution. The Wireman device intends to include greater tolerances between gear sets, as opposed to the present invention that provides an axially displacing countershaft design that accommodates unequal contact intervals and unequal load-sharing from a driving gear to the countershaft gears.

U.S. Pat. No. 4,709,590 to Richards discloses a change speed gear transmission having a plurality of spaced countershafts and countershaft gears thereon, a driving and driven means for rotating the countershafts, a central shaft and gears and a clutch means. The gears of the transmission are double-helical gears that assure that the load transmitting gear will tend to automatically self-align into a position where each countershaft transmits substantially equal torque load. Similar to the Wireman device, the Richards device includes a new gear design that attempts to solve unequal load sharing. The present invention provides axially adjustable countershaft gears to account for unequal load sharing between several countershafts from a driving input.

Finally, U.S. Pat. No. 6,374,689 to Morrow discloses a load balancing gear set apparatus that utilizes a balancing mechanism to deliver equal and optimum power to intermediate shafts within the transmission. The transmission includes a power input and pairs of intermediate elements that engage using helical gear sets. To obtain even power distribution between intermediate elements from the input, a mechanical balancing element comprising a lever mechanism mounted to a pivot point is provided, wherein the lever mechanism is permitted a rocking motion that displaces the intermediate shafts in the presence of load imbalance. Imbalanced loads in helical gears create axial loads that will pivot the lever mechanism into an equilibrium position. This design, while simple and effective for balancing countershaft transmission elements, requires a common lever mechanism to operate, and may not function with many countershafts beyond a simple pair. The present invention is adapted to allow free axial movement of each countershaft to balance these loads, wherein each countershaft is free to move independently based on input load displacing the countershafts into a state of equal load sharing.

The present invention provides an improved gear change mechanism and transmission that incorporates axially floating countershafts to account for load mismatch and further allow for the use of synchronizers for smooth gear transitions. It is submitted that the present invention is substantially divergent in design elements from the prior art, and consequently it is clear that there is a need in the art for an improvement to existing countershaft transmission devices. In this regard the instant invention substantially fulfills these needs.

SUMMARY OF THE INVENTION

In view of the foregoing disadvantages inherent in the known types of countershaft transmission assemblies now present in the prior art, the present invention provides a new transmission assembly that can be utilized for providing equal torque distribution between multiple countershafts while utilizing gear synchronizers for smoother gear transitions for the user.

It is therefore an object of the present invention to provide a new and improved countershaft transmission assembly that has all of the advantages of the prior art and none of the disadvantages.

It is another object of the present invention to provide a countershaft transmission assembly having multiple countershafts that are axially free floating to allow their gears to adjust axially to account for imbalance in load distribution from an input shaft.

Another object of the present invention is to provide a countershaft transmission assembly that incorporates adjustable countershafts in combination with synchronizers for improved gear changes that are smoother for the user.

Yet another object of the present invention is to provide a countershaft transmission assembly that can be designed having an overall shorter axial length, a compact volume, high power density and load capacity over existing countershaft transmissions having radially adjustable shafts.

Another object of the present invention is to provide a countershaft transmission assembly that reduces wear on the countershaft and input shaft components, reduces transmission harmonics, and further reduces transmission noise during operation.

A final object of the present invention is to provide a countershaft transmission assembly that can be utilized in a number of applications, including vehicle, heavy industry and other similar applications requiring gear reduction, gear change transmission or dynamic components for operation.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 2-1 shows a synchronizer installed on the conventional twin countershaft transmission.

FIG. 2-2 is a close-up view showing the large radial gap between the bore of the gear and the spline major diameter of the main shaft.

DETAILED DESCRIPTION OF THE INVENTION

Figure 1:
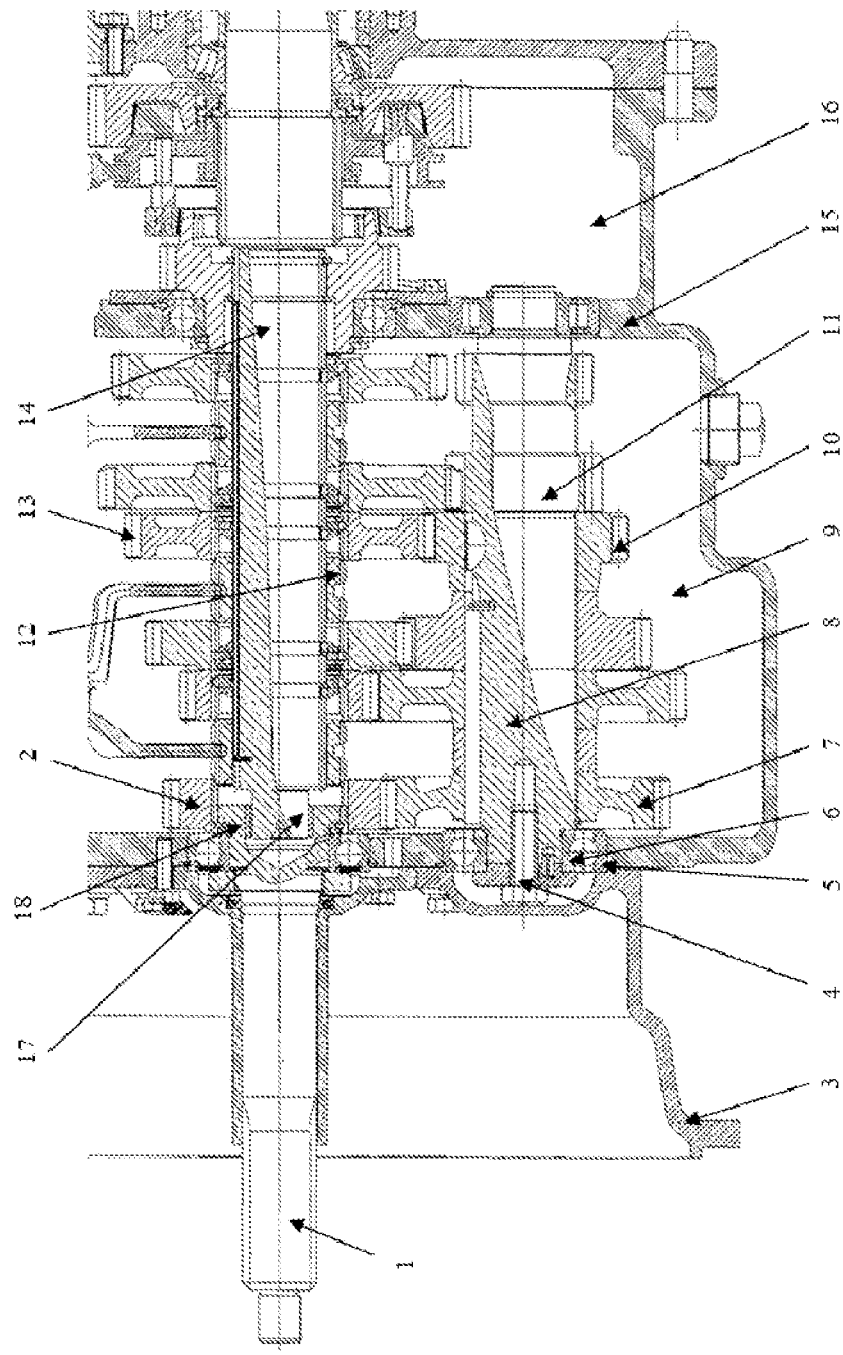
FIG. 1 shows a conventional twin countershaft transmission.

Reference is made herein to the attached drawings. Like reference numerals are used throughout the drawings to depict like or similar elements of the axially adjusting countershaft transmission assembly. For the purposes of presenting a brief and clear description of the present invention, the preferred embodiment will be discussed as used for transferring torque evenly between an input shaft and a plurality of countershafts to prevent wear, harmonics and high levels of noise during operation. The figures are intended for representative purposes only and should not be considered to be limiting in any respect.

Referring now to FIG. 1, there is shown a cross section view of a conventional multi-speed twin countershaft transmission, wherein a single countershaft assembly 8 is visualized in parallel to a main shaft 14 and positioned 180° in circumference around the main shaft from a second countershaft assembly (not shown). The components of the main transmission section 9 include with five forward gears and one reverse gear, along with parts of the auxiliary rear section 15 having two range gears. In the main section 9, the transmission include one input shaft 1 and a corresponding input gear 2, two countershaft subassemblies 8, a main shaft 14 and main shaft gears (for example: second gear 13 and three sliding clutches 12 without a synchronizer. Each countershaft subassembly 8 has one countershaft 11 and countershaft gears (for example: second gear 10) rotatably fixed along the countershaft 11. The countershaft subassembly 8 of this typical configuration cannot move axially relative to transmission housing 15 and clutch housing 3 since it is fixed by a plate and bolt 4, ball bearing 6, snap ring 5 and a clutch housing 3.

This conventional transmission is designed to ensure proper gear tooth contact and meshing between main shaft gears (for example: second gear 13) while seeking to center on the main shaft 14 during torque transfer to the two countershaft gears (for example: second gear 10) on the one countershaft assembly 8 and distributing the load evenly. It is submitted that while a centered and balanced transmission assembly may be designed, it is inherent during production that minor imperfections, assembly errors, tolerances and exposure to different heat gradients can cause uneven contact between the main shaft gears and the countershaft gears, which can lead to imbalances in load transfer, wearing and harmonics concerns. The main shaft gears (for example: second gear 13) may need to move radially outward from their center along the main shaft 14 in order to achieve the load sharing evenly. This creates radial gaps between main shaft 14, sliding clutch 12 and main shaft gears (for example: second gear 13), as well as between the left outside diameter 17 of main shaft 14 and the bore of the bushing 18 pressed into the bore of input shaft 1. This conventional design utilizes a radial floating load-share principle to evenly share the loads of two countershafts and the main shaft, where the main shaft 14 finds an equilibrium position by displacing radially from its center position. This type of countershaft transmission design utilizes a sliding clutch 12 and no synchronizer in order to achieve the load evenly on the gears of countershafts, which accounts for the radial movement of the gears on the main shaft.

While effective, this load share principle causes seriously problems for conventional twin or multiple countershaft transmission with synchronizers. When sliding clutches are replaced by synchronizers on the main shaft of this type of transmission, there is only local frictional cone surface contact and not full surface contact between synchronizer ring and conical shaped part of main shaft gears when shifting, because the main shaft gear will have the potential for radial displacement during couple as the floating main shaft finds equilibrium from its center. This causes significant problems for the synchronizer and transmission as a whole during gear changes, as the synchronizer rapidly wears and its lifespan is significantly shortened as a result, leading to premature failure. Further, shifting quality is reduced and the ability to load share between the gears of countershafts is significantly hampered. These problems have become a source of difficulty that has since been unresolved in an efficient manner as described by the present invention.

Figures 1, 2:
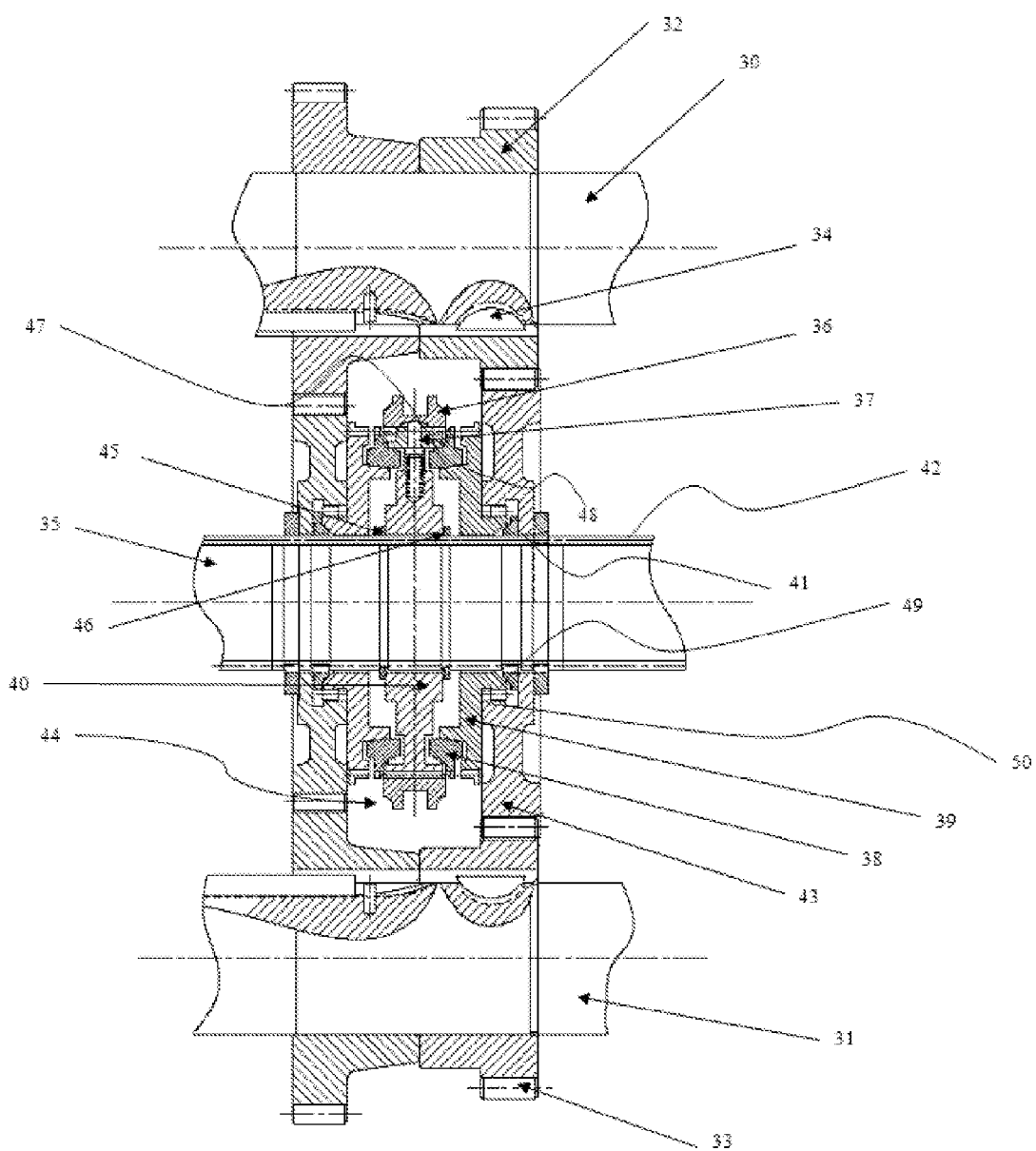
Figure 2:
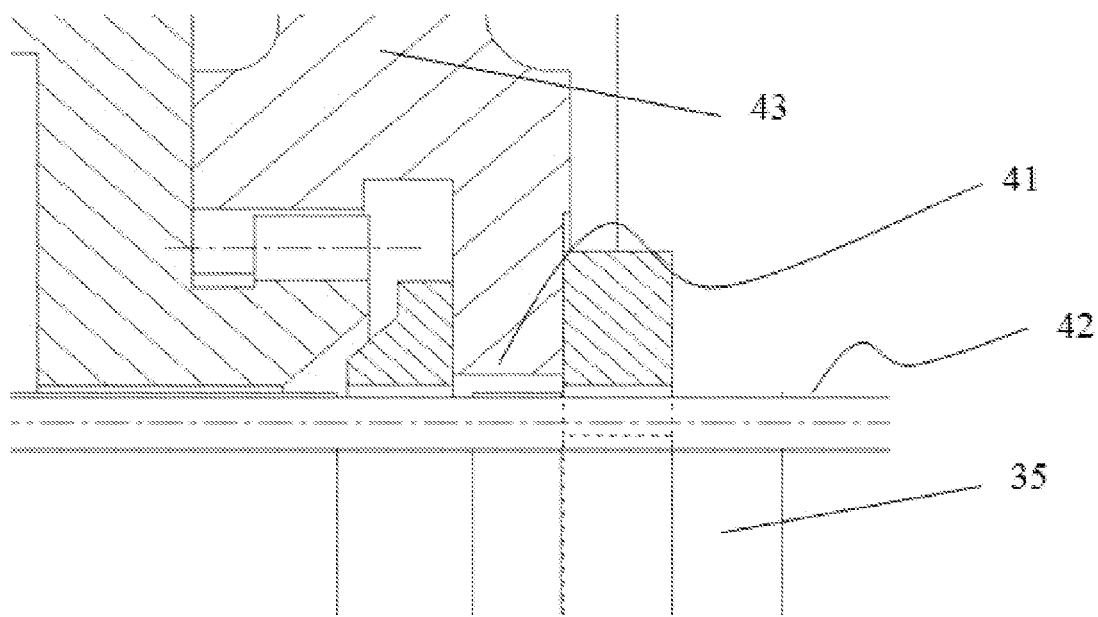

Referring now to FIG. 2-1, there is shown a cross section view of a synchronizer installed within a conventional twin countershaft transmission. A first gear 32 is fixed to a first countershaft 30 by a key 34, while a second gear 33 is fixed to a second countershaft 31, wherein two countershafts and their gears on the two countershafts are evenly spaced around a main shaft 35. A main shaft gear 43 is installed and freely rotated on the main shaft 35, which meshes with the two countershaft gears 32, 33. The first countershaft gear 32, second countershaft gear 33 and the main shaft gear 43 comprise a gear set for the selectable transmission assembly. There exists a large radial gap between the bore 41 of the main shaft gear 43 and the spline major diameter 42 of the main shaft 35. As a result of common manufacturing and assembly variation or error, the first 32 and second gear 33 on the two countershafts generally do not share load equally from the meshed gear 43 of the main shaft 35, causing the meshed gear to move radially to achieve an evenly distributed load between the two countershaft gears. Then internal spline 50 of the gear 43 will then push the external spline 49 of the synchronizer coupling ring 39, such that the synchronizer coupling ring 39 will also be moved up, creating a misalignment that leads to stress concentrations, increased wear and premature failure of the synchronizer.

A synchronizer 44 is installed on the main shaft 35 by spline coupling, while the synchronizer 44 is axially fixed by the two snap rings 45 and 46. When shifting to the second gear, the synchronizer sleeve 37 is pushed to the right by shift fork (not shown in FIG. 2-1), and the force is transferred through the block 37 to the internal friction cone 47 of synchronizer friction ring 38 together with the external friction cone 48 of synchronizer coupling ring 39. Therefore, only the local region of the friction cone is contacted between the synchronizer friction ring 38 and synchronizer coupling ring 39, creating an uneven coupled caused by the radial movement of the main shaft acquiring load equilibrium between countershafts previously explained detailed. Thus, the concept of radially displacing the main shaft to account for load share between countershafts has its drawbacks, wherein its use is prohibitive with respect to the use of gear synchronizers, as these components quickly deteriorate due to uneven coupling and thus lead to shortened life spans.

Referring now to FIG. 2-2, there is shown a close-up cross section view detailing the large radial gap of a conventional transmission assembly, wherein a gap exists between the bore 41 of the main shaft gear 43 and the spline major diameter 42 of the main shaft 35. This gap allows the main shaft gear 43 to "float" on the main shaft 35 to account for minor imperfections in contact between gears of multiple countershafts, where otherwise a static system would create uneven load and torque distribution between adjacent countershafts, and thus lead to increased wear and less efficient transmission of the torque between the multiple intermediate countershaft members. The radial gap is a common means for dealing with this issue; however the use of such a design limits the ability to utilize gear synchronizers in the assembly, which improve shift quality and engagement between gears during transition. The radial gap leads to non-uniform seating and engagement of the synchronizer friction cone, uneven wear and reduced component life. It is therefore submitted that a new and improved countershaft transmission is required that accounts for manufacturing flaws and tolerances, which allowing of the use of synchronizers without compromising their integrity and useful life.

Figure 3:
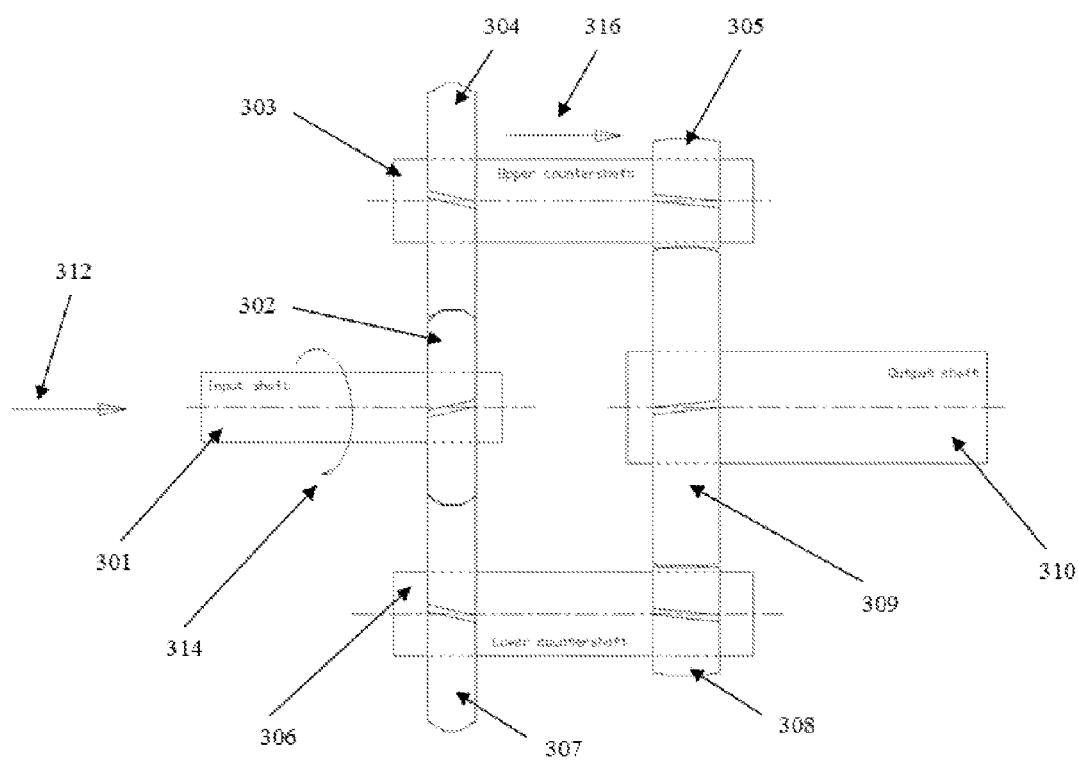
FIG. 3 shows the present invention, including the axially floating load share principle of the countershafts.

Referring now to FIG. 3, there is shown a schematic diagram of the elements and operation of the axially adjustable countershaft transmission assembly of the present invention. The principle of the present invention is one that allows axially floating countershafts 303 and 306, where these intermediate shafts are able to self-adjust in an axial direction based on uneven load input from the input shaft 301. This assures proper tooth contact between input shaft gear 302 and output shaft gear 309 and their mating countershaft gears (304, 307) and (305, 308), distributing the input load evenly through the countershaft subassemblies as they axially self-adjustment using helical gears as a means to transform the torque into axial load that is sensed by the countershafts and evened out through axial displacement.

Specifically shown in FIG. 3, where is included an input gear 302 having left helix hand teeth and internal spline driven end, and input shaft 301 having an external spline of driving end. At least two countershafts are provided for balancing input. First, an upper countershaft constant driven gear 304 having a right helix hand and an upper countershaft output driving gear 305 having a right helix hand rotation are provided, both upper countershaft gears being fixed to the upper countershaft 303. Second, a lower constant driven countershaft gear 307 having a right helix hand direction and an lower output driving countershaft gear 308 having a right helix hand direction are provided and both being fixed to a second countershaft 306. These at least two countershafts and corresponding driving gears 305 and 308 both engage an output gear 309 having a left helix hand fixed on the output shaft 310. The output gear 309 is fixed on the output shaft 310 and prevented from radially displacing. In contrast, the output gear 309 and output shaft 310 of the present invention are free to rotate on a needle roller bearing, and can further be coupled with the output shaft 310 by a synchronizer (not visualized in FIG. 3). The upper countershaft 303 with its gears 304 and 305 and lower countershaft 306 with its gears 307 and 308 are free to displace axially in both axial directions to account for nonuniform load distribution from the input gear 302. However, the input shaft 301, input gear 302 and output shaft 310 cannot be axially moved.

From the front of input shaft 301 look towards the output shaft 310 along the input arrow 312, the input shaft 301 is rotated in clockwise direction as shown 314. Assuming manufacturing and assembly defects or imperfections on these gears and shafts, only one gear set 302 or 304 is initially engaged and meshed upon initial rotation input rotation. Therefore the input gear 302 will continue to rotate a small angle before the gear set 304 and 307 are also meshed. Upon being meshed with the input, the input gear 302 meshes with the upper constant drive gear 304 and pushes the upper constant driven gear 304 with the upper countershaft 303 forward 316 until the upper output driving gear 305 is meshed with the output gear 309. In this way, the two gear sets on the upper countershaft 303 mesh with their mating gears 302, 309 at the same time. At this moment, the gear set 302 and 307 also become meshed, establishing the same axial displacement function as the first countershaft assembly such that even load distribution is achieved across all countershafts. Therefore, the countershafts' gear sets (4 sets) are all meshed simultaneously and account for minor gear imperfections, achieving an even load distribution between the countershaft subassemblies over a short time interval defined by their initiation period of axial movement. This defines the axial floating, self-adaptation and self-adjustment load sharing principle of the present invention.

Figure 4:
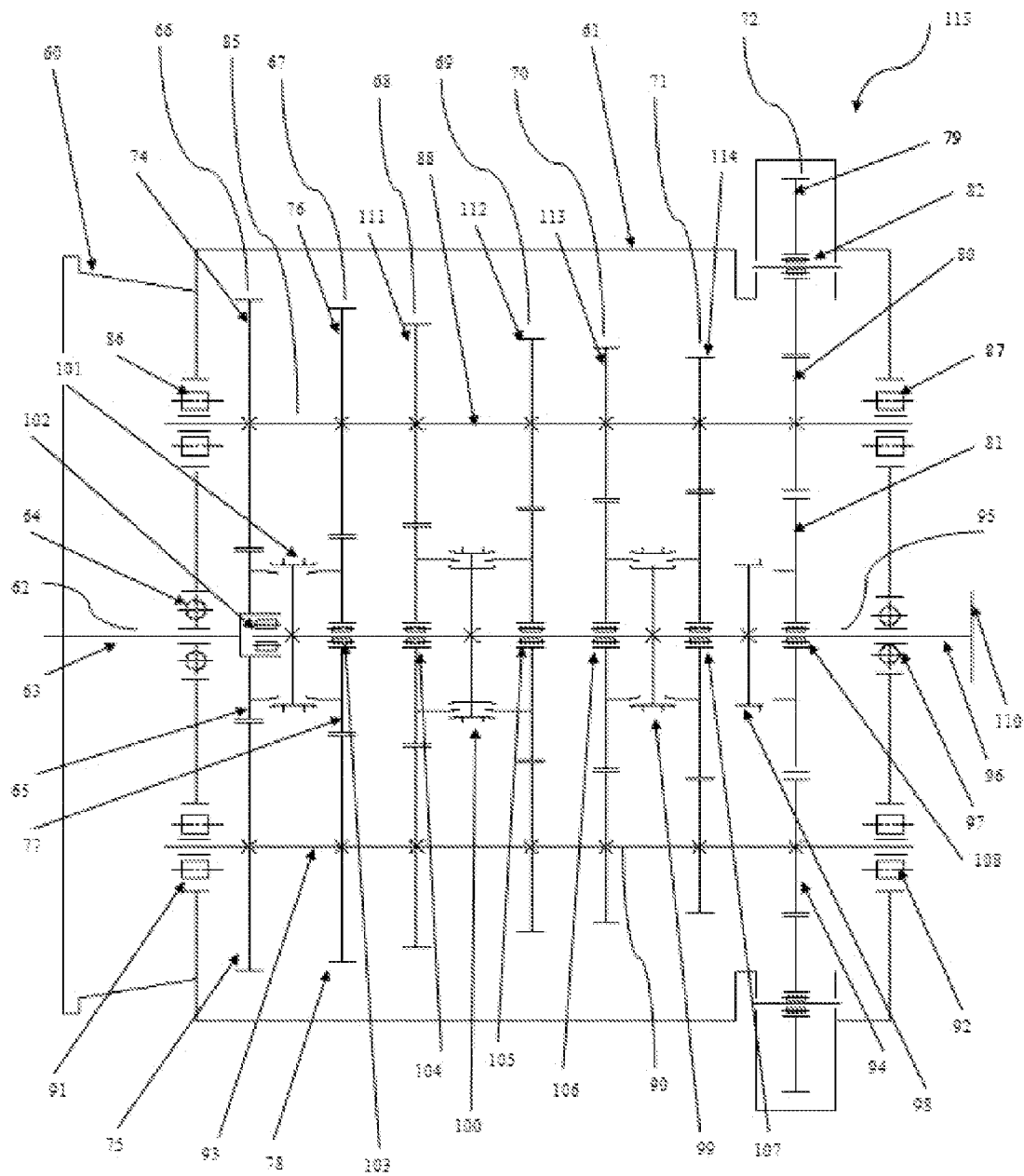
FIG. 4 shows the present invention in a six speed twin countershaft transmission having full synchronizers for all forward gears.

Referring now to FIG. 4, there is shown a schematic of the present invention in a six speed, twin countershaft transmission 115 with full synchronizers for all forward gears. This embodiment of the transmission assembly 115 has six forward gears and one reverse gear, and comprises a clutch housing 60, a transmission housing 61, input shaft subassembly 62, input shaft bearing 64, upper countershaft subassembly 85 with cylindrical roller bearings 86 and 87. Also provided is a lower countershaft subassembly 90 having cylindrical roller bearings 91 and 92, a main shaft subassembly 95 and pocket bearing 102, a rear output bearing 97, and output flange or yoke 110. The input shaft subassembly 62 and main shaft subassembly 95 are coaxial, while the two countershaft subassemblies 85 and 90 are evenly spaced apart 180° in circumference around the input shaft 63 and main shaft 96. The distance between input shaft 63 (or main shaft 96) and upper countershaft 88 and between input shaft 63 (or main shaft 96) and lower countershaft 93 are equal. The assembly also includes a constant gear train 66 including an input gear 65 having an internal spline assembled on the external spline of input shaft 63, wherein the input gear axial movement is fixed. The constant driven gear 74 on the upper countershaft 88 and constant driven gear 75 on the lower countershaft 93 are similarly fixed to each countershaft and prevented from relative movement. The fifth gear train 67 includes a fifth driven gear 77 freely rotating on a needle roller bearing 103 on the main shaft 96, meshing with a fifth driving gear 76 being fixed on the upper countershaft 88. The fifth driving gear 78 is fixed on the lower countershaft 93 and includes the same as the fourth gear train 68, third gear train 69, second gear train 70, first gear train 71 and reverse gear train 72. All gear trains utilize helical gears as a means to mesh complimentary gear sets. The main shaft subassembly 95 includes the main shaft 96, a first-second synchronizer 99, a third-fourth synchronizer 100, fifth-sixth synchronizer 101, a reverse sliding dog clutch 98, and all driven gears from the fifth driven gear 77 to the first driven gear to the reverse driven gear 81. The main shaft 96 can be a step shaft or a spline shaft with a major diameter or different major diameters.

All driven gears (from fifth to first and the reverse driven gear) can be free rotated separately on their needle roller bearings 104, 105, 106, 107 and 108, where the needle roller bearings can be free rotated separately on their ground step main shaft 96 or freely rotated separately on their splined main shaft 96 by installing a ground bushing between splined main shaft 96 and bore of each needle bearing. These bushings are relative stationary to the main shaft 96. All needle roller bearings can further be eliminated by pressing an anti-friction bushing into the bore of each driven gear and keeping a clearance fit between the bore of each bushing and main shaft 96, or by pressing an anti-friction bushing into the outside diameter of splined main shaft 96 for each driven gear and keeping a clearance fit between the outside diameter of each bushing and the bore of each driven gear, or directly keeping a clearance fit between the bore of each driven gear and the outside diameter of main shaft 96. A pocket needle roller bearing 102 is installed between the right bore of input shaft 63 and left outside diameter of main shaft 96 for supporting the main shaft subassembly 95, while the pocket needle roller bearing has clearance to fit with the bore of input shaft and the outside diameter of the main shaft, and can free rotate between them. The pocket bearing 102 also can be a drawn cup needle roller bearing, ball bearing, tapered roller bearing, cylindrical roller bearing or other suitable bearing or bushing deemed appropriate by one skilled in the art.

All gears (such as from 74, 76, 111, 112, 113, 114 to 80) on the upper countershaft 88 are helical gears with same helix hand (such as right hand) and are fixed on the upper countershaft 88. When the inner races of roller bearings 86 and 87 are interference fitted with the two ends (outside diameters) of the upper countershaft 88, the upper countershaft subassembly 85 can freely be moved axially in the fore and aft directions between the rollers and inner races of bearing 86 and 87, or between the upper countershaft subassembly with rollers and outer races of bearing 86 and 87, or between rollers and one inner race and one outer race of the two roller bearing 86 and 87 based on the designed types of two roller bearings 86 and 87 utilized in the assembly. Based on different designs, the upper countershaft subassembly 85 is free to be moved axially in both axial directions between the two ends of the upper countershaft 88 and the bores of two roller bearings, or the upper countershaft subassembly 85 having two roller bearing 86 and 87 can be moved axially between two outside diameters of the two bearings 86 and 87 and the bores of transmission housing. It is understood that the two roller bearings 86 and 87 can be substituted with other types of bearings that are suitable for the present application.

As is true with all gears on the upper countershaft 88, all gears on the lower countershaft 93 are helical gears with same helix hand (such as right hand), and are fixed on the lower countershaft 93. The same functions and operational description for the upper countershaft is intended for the lower countershaft subassembly 90 and two roller bearings 91 and 92, wherein the lower countershaft subassembly 90 is free to move axially in both axial directions in a similar manner as the upper countershaft. The helical angle and other gear parameters of these gears can be selected and/or designed by specific structural and design requirements as necessary, falling within the scope of providing an axial force to balance the countershafts during engagement. Input power is transmitted from engine crank shaft and main clutch through input shaft 63 and to input gear 65, which then the power is split between the two constant driven gears 74 and 75 of the countershafts 88 and 93. By way of example, when the synchronizer 101 is shifted to fifth gear, power is transmitted through the two fifth driving gears 76 and 78, when then merge the power to the fifth driven gear 77, through the synchronizer 101 to main shaft 96 and output flange 110 to prop shaft (not visualized). When the fifth-sixth gear synchronizer 101 is shifted to sixth gear, the power is transmitted from input shaft 63 and input gear 65, through the fifth-sixth gear synchronizer 101 to main shaft 96 and to the output flange 110 to the prop shaft.

If the four gear sets (i.e. two constant gear sets and two fifth gear sets) are not all simultaneously contacted because of minor manufacturing and assembling imperfections, only three gear sets contact (two constant gear sets 65, 74 and 65, 75 and one fifth gear set 78, 77) as the synchronizer 101 shifts to the fifth gear, as another fifth gear set 76, 77 is not fully contacted. Caused by this mismatch in contact load, the axial force is generated in the gear set 65, 74 that will push the upper countershaft subassembly 85 axially forward slightly, such that the fifth gear set 76, 77 will be more completely meshed. This allows the four gear sets to be contacted and meshed at the same time, thus achieving equal load share between the two countershaft subassemblies 85 and 90. This means of operation demonstrates the operation of the present invention and the axially floating countershaft self-adaptation and load sharing principle. This process automatically finishes over a short time interval during the shifting stage. The total axial forces on any one countershaft subassembly created by constant gear set and any one gear set can be designed to counteract totally or partially by selecting a suitable helix angle and other gear parameters according to requirements. This means of adjustment for a six-speed twin countershaft transmission 115 can also can applied to a triple, four or multiple countershaft transmission exceeding four; the three or four countershaft subassemblies being evenly spaced apart at 120° or 90° from the input shaft 63 and main shaft 96.

Figure 5:
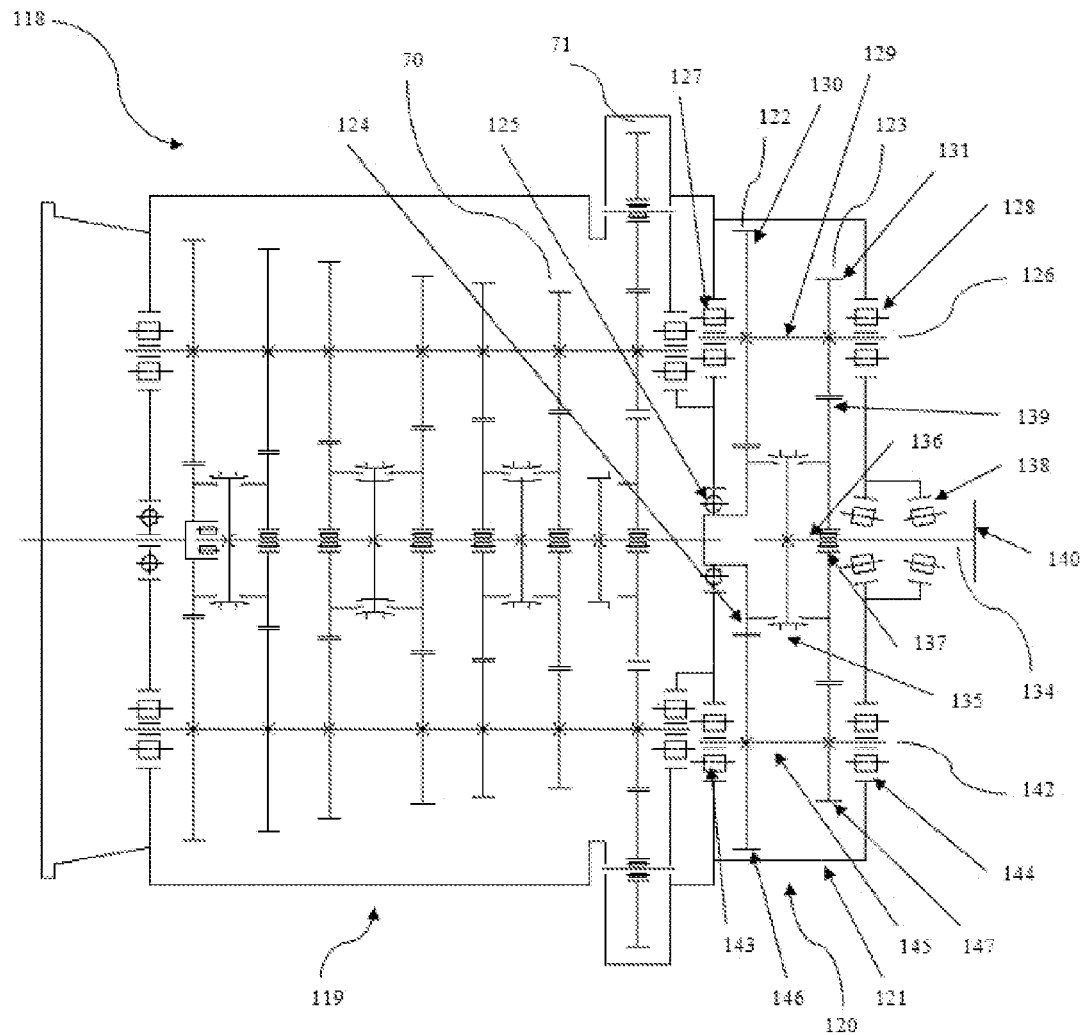
FIG. 5 shows the present invention for a twelve speed twin countershaft transmission having full synchronizers for all forward gears.

Referring now to FIG. 5, there is shown an embodiment of the present invention in a twelve-speed twin countershaft transmission 118 with full synchronizers for all forward gears. The transmission 118 includes a six-speed front section 119 and a two speed auxiliary section or auxiliary range change 120 to form twelve forward gears and two reverse gears. The six-speed front section 119 is same as the six-speed twin countershaft transmission 115 shown and described in the FIG. 4, with the except that the output flange 110 is replaced by a rear constant driving gear 124 in the auxiliary section 120. The construction and operation of auxiliary section 120 are described herein as follows: the two-speed auxiliary section 120 includes auxiliary section housing 121, a rear upper countershaft subassembly 126 supported along cylindrical roller bearings 128 and 127, a rear lower countershaft subassembly 142 supported along cylindrical roller bearings 143 and 144, an output shaft subassembly 134 supported along a rear tapered bearing pair 138, and finally an output flange or yoke 140. The main shaft subassembly 95 shown in FIG. 4 and output shaft subassembly 134 are coaxial, while the two rear countershaft subassemblies 126 and 142 are evenly spaced apart 180° about the output shaft 136 and main shaft 96, and apart from the two countershaft subassemblies 85 and 90 in the front section 119. The same center distances are provided between output shaft 136 and rear upper countershaft 129 as between output shaft 136 and rear lower countershaft 145 in the auxiliary section 120, which can be the same or bigger than the center distances in the front section 119.

The rear constant gear train 122 includes a rear constant driving gear 124 having left helix hand teeth and an internal spline installed on the external spline of main shaft 96, a rear constant driven gear 130 fixed on the rear upper countershaft 129 and a rear constant driven gear 146 fixed on the rear lower countershaft 145. The reduction gear train 123 includes a reduction driven gear 139 free rotated on a needle roller bearing 137 along the output shaft 136, an upper reduction driving gear 131 is provided on the rear upper countershaft 129 and a lower reduction driving gear 147 is provided on the rear lower countershaft 145. The output shaft subassembly 134 includes an output shaft 136, a range synchronizer 135, the reduction driven gear 139 and a needle roller bearing 137. The reduction driven gear 139 is freely rotated on its needle roller bearing 137, or which can be freely rotated on the ground step output shaft 136 with a very small clearance fit. The needle roller bearing 137 can also can be eliminated by pressed an anti-friction bushing into the bore of the reduction driven gear 139 to maintain a clearance fit between the bore of each bushing and output shaft 136, or substituted in favor of other suitable means. The output shaft subassembly 134 and output flange 140 are supported by the rear tapered bearing pair 138, while the rear constant driving gear 124 is supported by the ball bearing 125.

The two gears 130 and 131 on the rear upper countershaft 129, as previously state, are helical gears with the same helix hand direction and are fixed on the rear upper countershaft 129. When the inner races of roller bearings 126 and 127 are interference fitted with the outside diameters of the rear upper countershaft 129, the rear upper countershaft subassembly 126 can be axially displaced in both axial directions between the rollers and inner races of bearing 128 and 127, or between the rollers and outer races of bearing 128 and 127, or finally between rollers and one inner race and one outer race of the two roller bearing 128 and 127 based on the designed types of two roller bearings 128 and 127. Based on different designs, the rear upper countershaft subassembly 126 is freely moved in the axial direction between the two outside diameters of the rear upper countershaft 129 and the bores of two roller bearings, or the rear upper countershaft subassembly 126 with two roller bearing 128 and 127 can be axially free in both directions between the two outside diameters of the two bearings 128 and 127 and the bores of the auxiliary section housing. The two roller bearings 128 and 127 can further be substituted with other bearing types as desired, falling within the scope and intention of the present invention. The two gears 146 and 147 on the rear lower countershaft subassembly 142 are also helical gears with same helix hand. These functions and descriptions are extended for the rear lower countershaft subassembly 142 and two roller bearings 143 and 144, wherein the rear lower countershaft subassembly 142 is similarly free to move in its axial direction to account for even load distribution from its input.

As is with the six-speed twin countershaft transmission 115, the power on the twelve-speed twin countershaft transmission 118 is transmitted from engine crank shaft through input shaft 63 to input gear 65, then split through two constant driving gears 74 and 75 to two countershafts 88 and 93. By way of another example for the present embodiment: when synchronizer 101 is shifted to fifth gear, the power is transmitted through the two fifth driving gears 76 and 78 (FIG. 4), which then merge the power to the fifth driven gear 77 and further through the synchronizer 101 to main shaft 96 and rear constant driving gear 124 in the auxiliary section 120. The power is then split through two rear constant driven gears 130 and 146 to the two rear countershafts 129 and 145 again, where the range synchronizer 135 is shifted to low range gear, and the power is transmitted through the two reduction driving gears 131 and 147. The power is then merged with the reduction driven gear 139, and finally through the range synchronizer hub to the output shaft 136 and output flange 140 to prop shaft (not shown). When the range synchronizer 135 is shifted to high range gear, the power flow is transmitted from main shaft 96 and rear constant driving gear 124 in the auxiliary section 120, through the range synchronizer 135 and directly to the output shaft 136 and output flange 140 to prop shaft.

Even if the four gear sets in the front section (i.e. two constant gear sets and two gear sets) are not all initially and uniformly contacted due to contact discontinuities and unmeshed pairs resulting from minor gear manufacturing imperfections or errors, the four gears will be contacted at the same time during the shifting after the countershafts axially adjust to evenly share the input load. The axially floating adaptation of the countershafts in the forward section is same as the six-speed twin countershaft transmission 115 described in the above FIG. 4 description. If the four gear sets in the auxiliary section (i.e. two rear constant gear sets and two reduction gear sets) are similarly not equally contacted, for example, only three gear sets are contacted (two constant gear sets 124, 130 and 124, 146 and one reduction gear set 139, 147) during the range synchronizer 135 shifting to the reduction gear as another reduction gear set 139, 131 is not contacted, then the axial force created by the gear set 124, 130 mesh will push the rear upper countershaft subassembly 126 axially forward such that the gear set 139, 131 will be more closely in contact and in equilibrium with adjacent countershafts. The same operation as above for the six-speed twin countershaft transmission 115 of FIG. 4 is applicable and extends to this embodiment, wherein the four gear sets in the auxiliary section will be contacted at the same time during range synchronizer shifting after the countershafts adapt and displace as equal load sharing is accomplished during shifting stage. What is achieved, therefore, is an even load between the two countershaft subassemblies 126 and 142 and therefore even torque distribution. The axial floating adaptation is suitable for the auxiliary section, wherein the total axial forces on any one rear countershaft subassembly created by rear constant gear set and reduction gear set can be designed to counteract totally or partially through the selection of appropriate and suitable helix gear tooth angles and other gear design parameters. For an experienced engineer or designer, through little design changes the twelve-speed twin countershaft transmission 118 also can be changed to eleven-speed twin countershaft transmission with eleven forward gears and one reverse gear if the first gear train 70 and reverse gear train 71 only work at a lower range change gear.

As previously described, the twelve-speed twin countershaft transmission 118 further utilize a triple or four countershaft design in the front section and auxiliary section, or twin countershafts in the front section and triple or four countershafts in the auxiliary section. The three or four countershaft subassemblies are evenly spaced apart 120° or 90° from the input shaft 63 and main shaft 96 and output shaft 136. The auxiliary section 120 of the transmission 118 can also be a three-speed auxiliary range change with the six-speed front section 119 to form eighteen forward gears and three reverse gears, or seventeen forward gears and two reverse gears based on few design changes.

Figure 6:
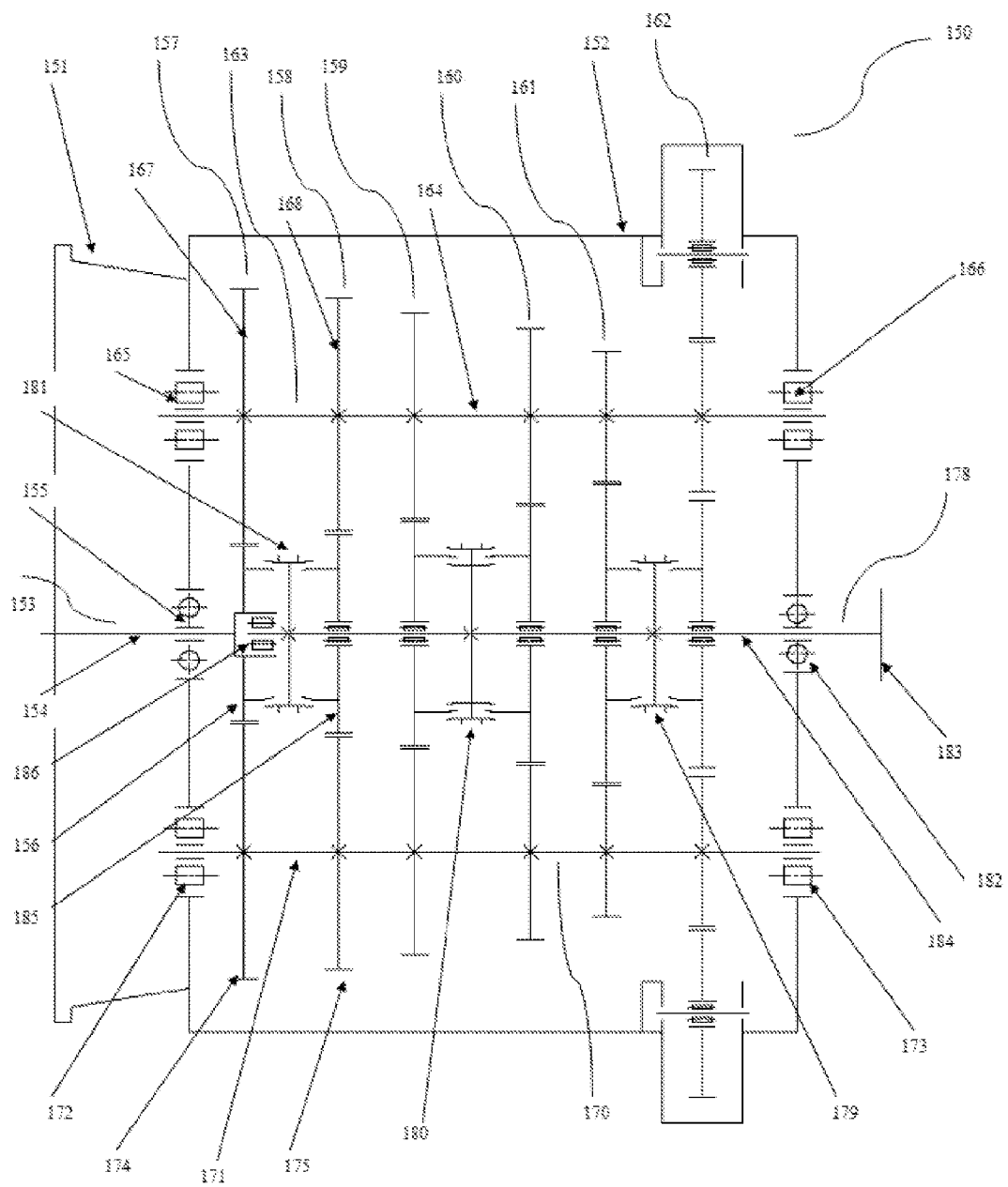
FIG. 6 shows another exemplary embodiment of a five speed twin countershaft transmission configuration having full synchronizers for all forward gears.

Another exemplary embodiment of a five-speed twin countershaft transmission configuration 150 with full synchronizers for all forward gears is shown and presented in FIG. 6 according to the instant invention. The transmission 150 has five forward gears and one reverse gear, which is very similar to the six-speed twin countershaft transmission 115 shown in FIG. 4, with the exception of having one gear train and one sliding dog clutch less than the six-speed transmission 115. Other components and their configuration are very similar as that of six-speed transmission. The twin countershaft transmission 150 includes a clutch housing 151, transmission housing 152, input shaft subassembly 153, input shaft bearing 155, a upper countershaft subassembly 163 supported along cylindrical roller bearings 165 and 166, a lower countershaft subassembly 170 supported along cylindrical roller bearings 172 and 173, a main shaft subassembly 178 having a pocket bearing 186 and rear output bearing 182, and finally an output flange or yoke 183.

Six helical gear trains and three synchronizers are provided, including a constant gear train 157, fourth gear train 158, third gear train 159, second gear train 160, first gear train 161, reverse gear train 162, reverse/first synchronizer 179, second/third gear synchronizer 180, and finally a fourth/first gear synchronizer 181 in the five-speed transmission 150. All gears on the upper countershaft subassembly 163 and lower countershaft subassembly 170 are helical gears having the same helix hand, and are separately fixed on the upper countershaft 164 and low countershaft 171, which is the same configuration as the six-speed twin countershaft transmission 115. In operation, power flows into the system and the same axially floating countershafts of the five-speed transmission 150 are utilized in six-speed twin countershaft transmission 115. The five-speed twin countershaft transmission 150 further can be triple or four countershaft transmission; the three or four countershaft subassemblies being evenly spaced apart 120° or 90° from the input shaft 154 and main shaft 184.

Figure 7:
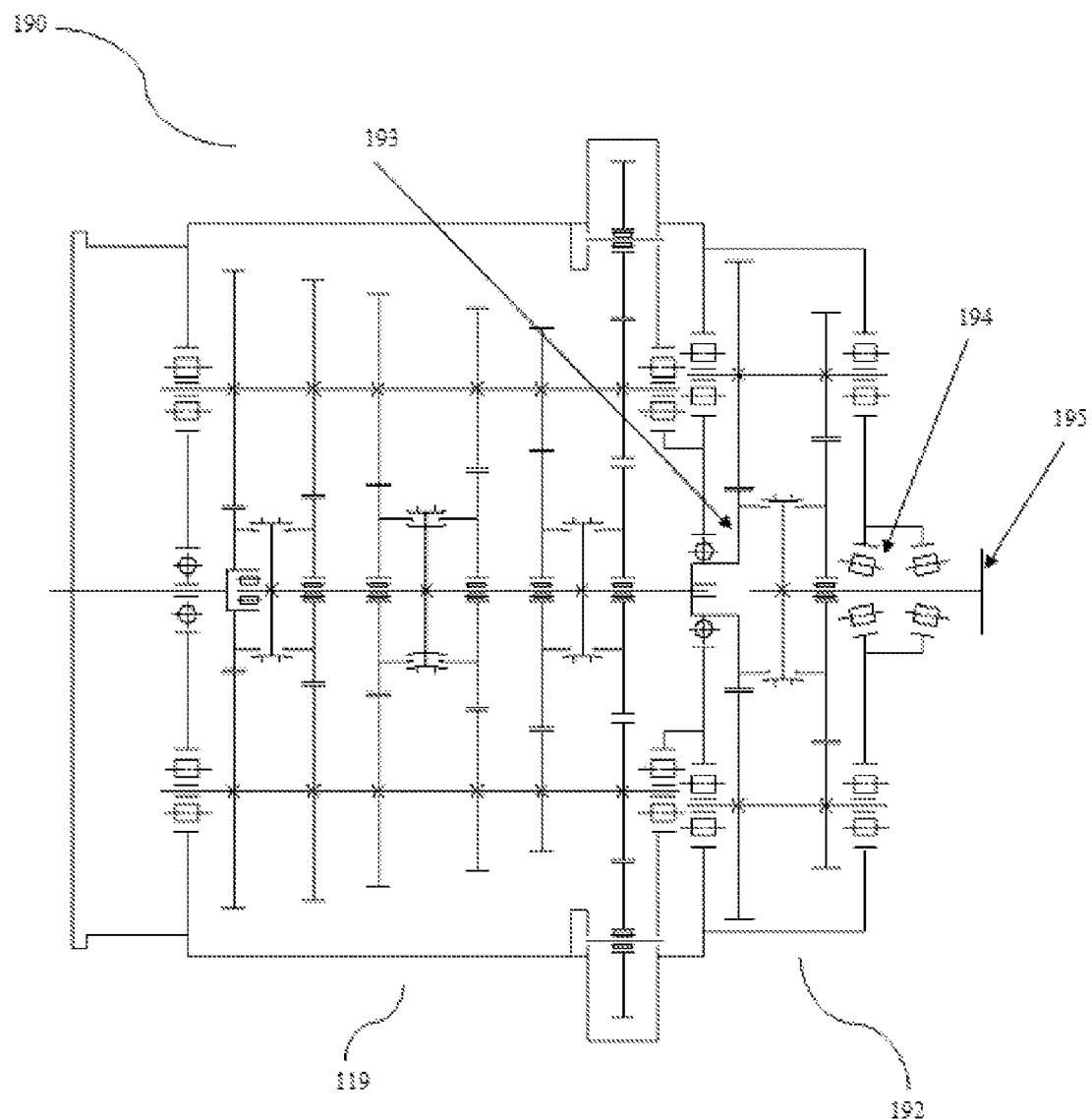
FIG. 7 shows another exemplary embodiment of a ten speed twin countershaft transmission configuration with full synchronizers for all forward gears.

Referring now to FIG. 7, there is shown another exemplary embodiment of the present invention, wherein a ten-speed twin countershaft transmission configuration 190 with full synchronizers for all forward gears is shown according to the present invention. The ten-speed transmission 190 is very similar as the twelve-speed twin countershaft transmission 118 shown in FIG. 5, with the exception that the front section 191 is comprised of five speeds rather than six speeds of the twelve-speed transmission 118. The ten-speed transmission includes a five-speed front section 191 and a two-speed auxiliary section or auxiliary range change 192, forming ten forward gears and two reverse gears. The five-speed front section 191 is the same as the five-speed twin countershaft transmission 150 shown and described in FIG. 6, except that the output flange 183 is replaced by rear constant driving gear 193 in the auxiliary section 192. The construction and operation of auxiliary section 192 of the ten-speed transmission 190 are same as the auxiliary section 120 of twelve-speed transmission 118 displayed in the FIG. 5. All gear trains in the front section 191 and auxiliary section 192 are also of the helical design. The helix hands of all gears on the two countershaft subassemblies and two rear countershaft subassemblies are same.

The ten-speed embodiment operation incorporates the floating countershaft design of the present invention. In the ten-speed twin countershaft transmission, power flows in as the floating and self-adapting countershafts adjust to evenly distribute torque from the input, as is described in the twelve-speed twin countershaft transmission 118 shown and described in FIG. 5. With few design changes, the ten-speed twin countershaft transmission 190 can also be changed to a nine-speed twin countershaft transmission with nine forward gears and one reverse gear if the first gear train 161 and reverse gear train 162 are only worked at lower range change gear. The ten-speed twin countershaft transmission 190 also can utilize triple or four countershafts in the front section and auxiliary section, or twin countershafts in the front section and triple or four countershafts in the auxiliary section. The three or four countershaft subassemblies are evenly spaced apart 120° or 90° from the input shaft and main shaft and output shaft. The auxiliary section 191 of the transmission 190 can also be a three-speed auxiliary range change with the five-speed front section 192 to form fifteen forward gears and three reverse gears, or fourteen forward gears and two reverse gears based on few design changes.

Figure 8:
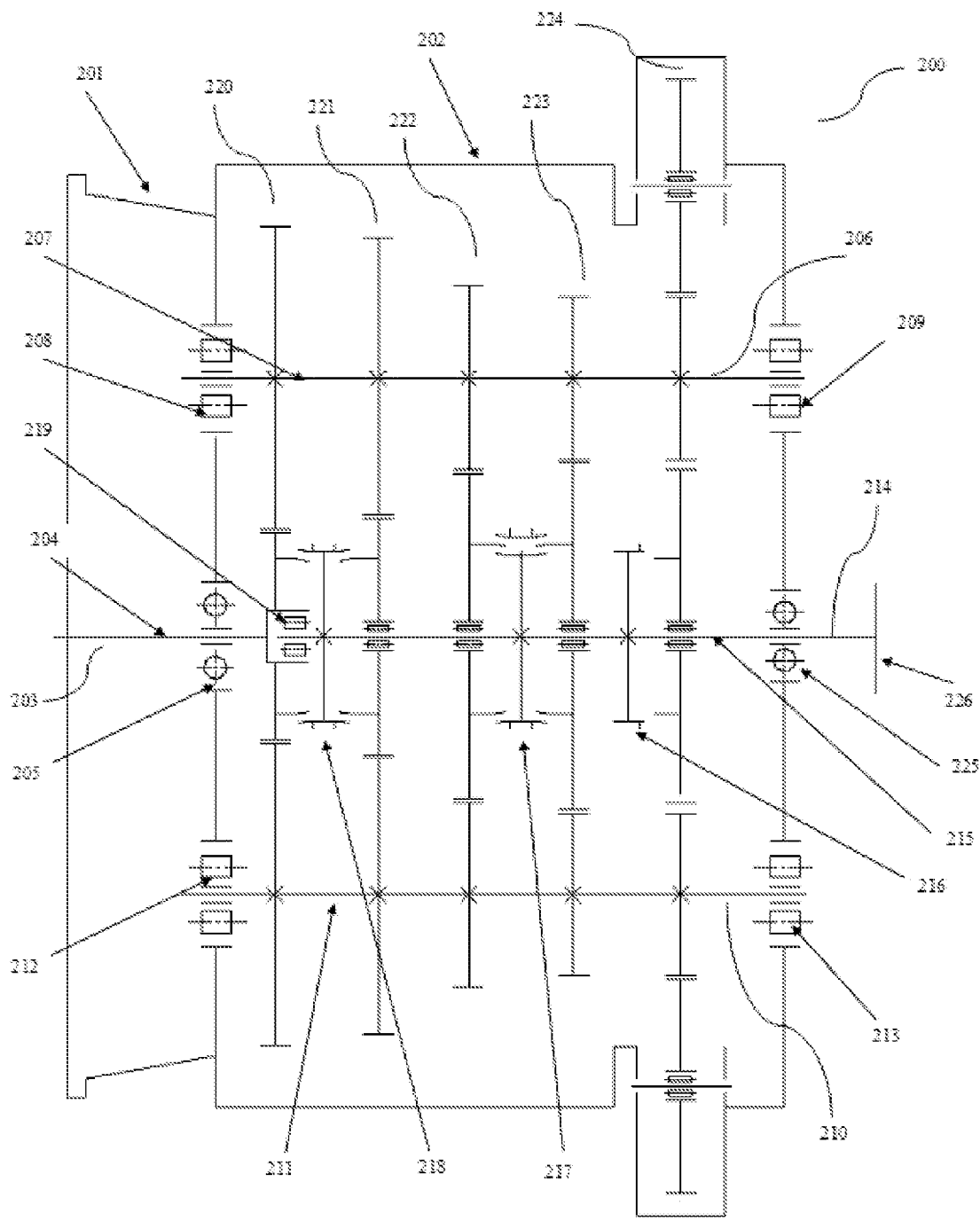
FIG. 8 shows another exemplary embodiment of a four speed twin countershaft transmission configuration having full synchronizers for all forward gears.

Referring now to FIG. 8, there is shown another exemplary embodiment of the present invention, wherein a four-speed twin countershaft transmission configuration 200 with full synchronizers for all forward gears is shown. The transmission 200 includes four forward gears and one reverse gear, which is very similar as the six-speed twin countershaft transmission 115 shown in FIG. 5, except having two gear trains and one synchronizer less than the six-speed transmission embodiment. The four-speed twin countershaft transmission 200 includes a clutch housing 201, transmission housing 202, input shaft subassembly 203, input shaft bearing 205, upper countershaft subassembly 206 along cylindrical roller bearings 208 and 209, lower countershaft subassembly 210 along cylindrical roller bearings 212 and 213, a main shaft subassembly 214 along a pocket bearing 219 and rear output bearing 225, and finally an output flange or yoke 226. There are five helical gear trains, two synchronizers and one sliding dog clutch, such as constant gear train 220, third gear train 221, second gear train 222, first gear train 223, reverse gear train 224, reverse sliding dog clutch 216, a first-second synchronizer 217 and third-fourth synchronizer 218. As with previous embodiments, all gears on the upper countershaft subassembly 206 and lower countershaft subassembly 210 are helical gears with same helix hand are separately fixed on the upper countershaft 207 and low countershaft 211, while the countershafts are capable of axially floating to create even contact with the input and thus uniform load input on all countershafts. The four-speed twin countershaft transmission 200 can also include a triple or four countershaft transmission.

Figure 9:
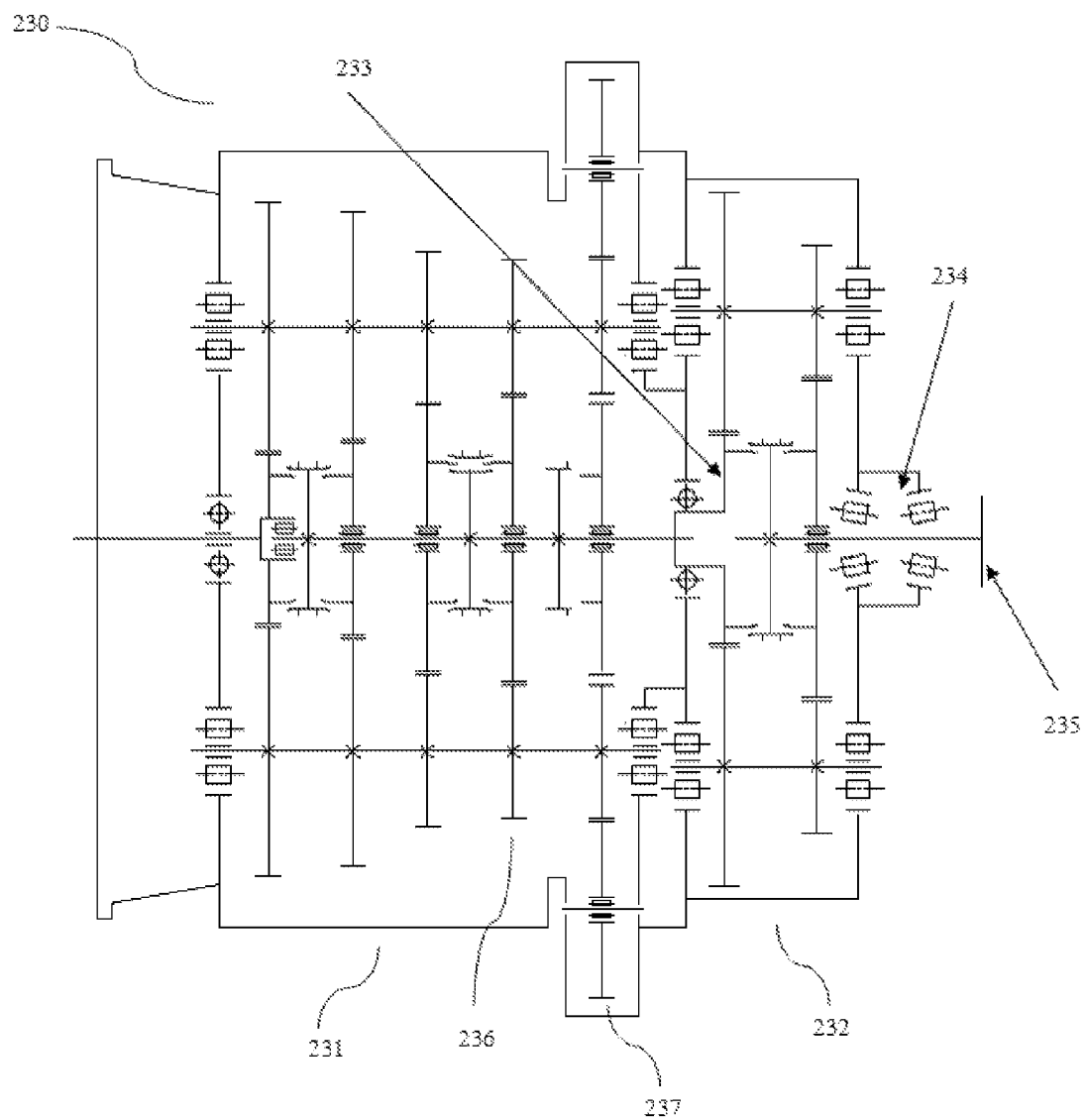
FIG. 9 shows another exemplary embodiment of an eight speed twin countershaft transmission configuration having full synchronizers for all forward gears.

Referring now to FIG. 9, there is shown another exemplary embodiment of the present invention, wherein an eight-speed twin countershaft transmission configuration 230 with full synchronizers for all forward gears is shown. The eight-speed transmission 230 is very similar as the twelve-speed twin countershaft transmission 118 shown in FIG. 5, except the front section 231 is a four-speed rather than a six-speed in the twelve-speed transmission 118. The eight-speed transmission includes a four-speed front section 231 and a two-speed auxiliary section or auxiliary range change 232 to form eight forward gears and two reverse gears. The four-speed front section 231 is same as the four-speed twin countershaft transmission 201, as shown and described in the FIG. 8, with the exception that the output flange 226 is replaced by rear constant driving gear 233 in the auxiliary section 232. The construction and operation of auxiliary section 232 of the eight-speed transmission 230 are same as the auxiliary section 120 of twelve-speed transmission 118 in FIG. 5. All gear trains in the front section 231 and auxiliary section 232 similarly comprise a helical gear set. The helix hands of all gears on the two countershaft subassemblies and two rear countershaft subassemblies are also the same. The floating countershaft principle is applied to this embodiment of the transmission assembly to account for equal load share and torque application to all countershafts. The eight-speed twin countershaft transmission 230, as with previous embodiments, can also be changed to a seven-speed twin countershaft transmission with seven forward gears and one reverse gear if the first gear train 236 and reverse gear train 237 are only worked at lower range change gear. The eight-speed twin countershaft transmission 230 can also include three or four countershafts in the front section and auxiliary section, or twin countershafts in the front section and three or four countershafts in the auxiliary section. The three or four countershaft subassemblies are evenly spaced apart 120° or 90° from the input shaft and main shaft and output shaft. Finally, the auxiliary section 232 of the eight-speed transmission 230 can also be a three-speed auxiliary range change with the four-speed front section 231, forming twelve forward gears and three reverse gears, or eleven forward gears and two reverse gears.

Figure 10:
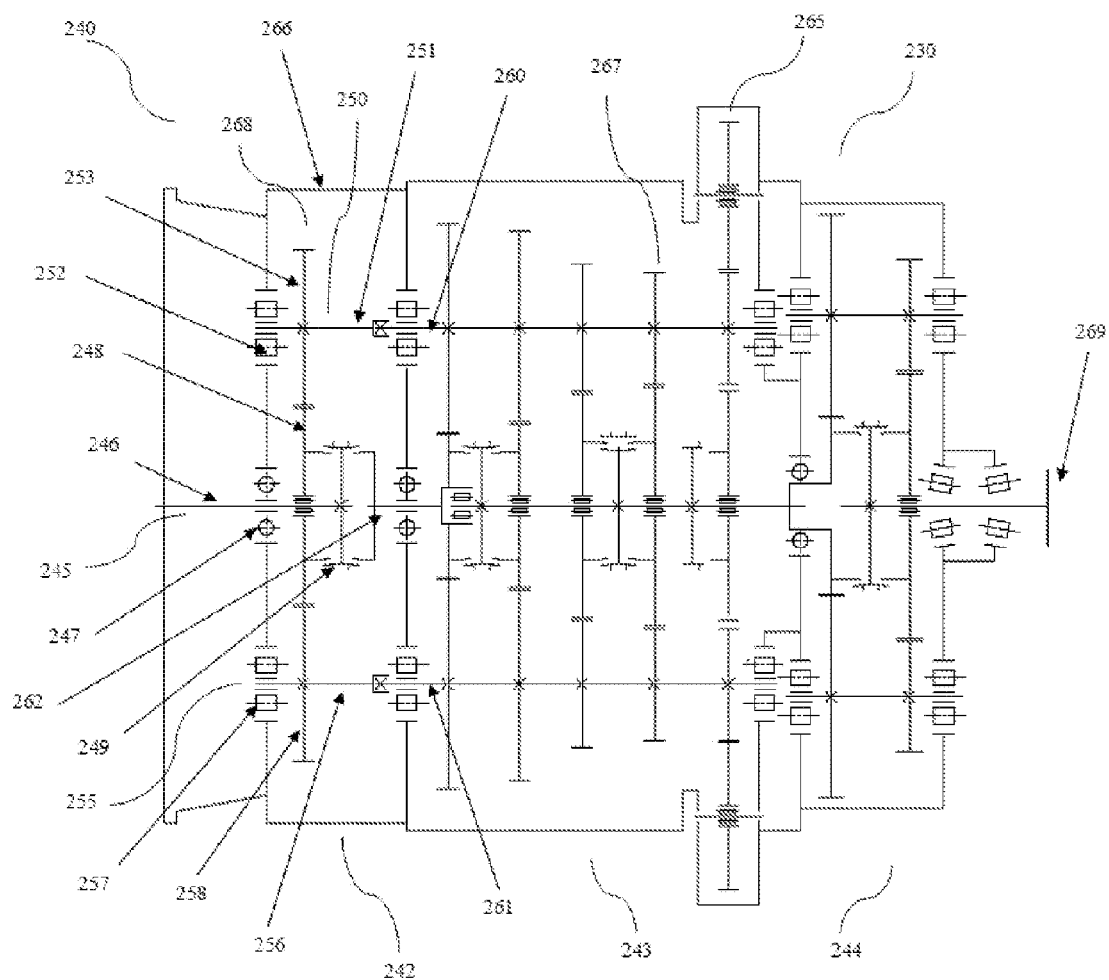
FIG. 10 shows another exemplary embodiment of a sixteen speed twin countershaft transmission configuration having full synchronizers for all forward gears.

Finally referring to FIG. 10, there is shown another exemplary embodiment of the present invention, wherein a sixteen-speed twin countershaft transmission configuration 240 with full synchronizers for all forward gears is shown in conjunction with the countershaft free axial movement of the present invention. The sixteen-speed transmission 240 includes an eight-speed twin countershaft transmission 230 as shown in FIG. 9 in addition to an auxiliary front section 242 in front of the eight-speed transmission 230, together forming sixteen forward gears and four reverse gears, or two reverse gears based on demand. The auxiliary front section 242 has an auxiliary front section housing 266, an input shaft subassembly 245, an input shaft bearing 247, split synchronizer 249 fixed on the input shaft 246, a front upper countershaft subassembly 250 supported along cylindrical roller bearings 252, a front lower countershaft subassembly 255 also supported cylindrical roller bearings 257 and a split gear train 268. The rear end of front upper countershaft 251 is coupled with the front end of upper countershaft 260 via a spline interface or similar suitable coupling method, while the rear end of front lower countershaft 256 is coupled to the front end of lower countershaft 261 via the same or similar means.

When the split synchronizer 249 is shifted to the left side, power is transmitted from input shaft 246 through split synchronizer 249 and to input gear 248, then it is split into the two front constant driven gears 253 and 258. The power is then transferred through the two front countershafts 251 and 256 to two countershafts 260 and 261 on the main section 243, and further through one synchronized gear train on the main section 243 to merge the power to main shaft. Finally, the power is routed through the rear section 244 to output flange 269. When split synchronizer 249 is shifted to the right, the power is transmitted from the input shaft 246 through split synchronizer 249 to main input shaft 262, and then the power flow will follow the same as the eight-speed twin countershaft transmission 230 shown and described in FIG. 9. The input shaft subassembly 245 and main input shaft 262 are coaxial, while the two front countershafts 260 and 261 are evenly spaced apart 180° from the input shaft 246 and main input shaft 262. The same center distance between input shaft 246 and front upper countershaft 25 exists between input shaft 246 and front lower countershaft 256. Further, all gear trains in the auxiliary front section 242, main section 243 and auxiliary rear section 244 are helical gear set, as described in previous embodiments. The helix hands of all gears on the two front countershaft subassemblies, two countershaft subassemblies and two rear countershaft subassemblies are same, wherein the helical gears allow torque transfer to also create axial load on the countershafts if uneven contact is made from the input.

The sixteen-speed twin countershaft transmission's operation and the axially floating countershafts of the present invention are the same as that of the twelve-speed twin countershaft transmission 118 shown in FIG. 5. Few design changes would be necessary for the sixteen-speed twin countershaft transmission 240 to be changed to a fourteen-speed twin countershaft transmission with fourteen forward gears and two reverse gears, where the first gear train 267 and reverse gear train 265 on the main section 243 are worked only at the lower range change gear on the auxiliary rear section 244. As previously noted, the sixteen-speed twin countershaft transmission 240 can also include three or four countershafts in the front section and auxiliary section, or twin countershafts in the front section and three or four countershafts in the auxiliary section. The three or four countershaft subassemblies are evenly spaced apart 120° or 90° from the input shaft, main input shaft, main shaft and output shaft. Finally, the auxiliary rear section 244 of the sixteen-speed transmission 240 can also be a three-speed auxiliary rear section with the two-speed auxiliary front section 242, four-speed main section 243 to form twenty-four forward gears and four reverse gears, or twenty-two forward gears and four reverse gears based on minor design changes.

The foregoing embodiments of the present invention are presented as variations to common transmission assemblies that can be modified or designed to utilize the floating countershafts of the present invention. It is submitted that several transmission variations may be designed utilizing the present countershaft system, and the examples listed previous constitute but illustrative examples of common implementations that would serve well in several capacities or applications, including gear change transmissions in buses, trucks and construction vehicles. It is submitted that conventional twin and multiple countershaft transmissions are designed to ensure proper and uniform tooth contact is made between main shaft gears engaging countershafts by allowing the main shaft to seek an equilibrium center through radial displacement thereof. This accounts for manufacturing flaws and misalignments of the gears and countershafts, as the main shaft gears move radially outward of their coaxial alignment with the main shaft in order relieve excess stress and to achieve the load sharing. As a result of the radial gaps, the use of gear synchronizers in this type of transmission is prohibitive. To address this common drawback, the present invention is submitted as an improved countershaft transmission assembly, wherein the main shaft gears are statically centered, while uneven loads or contact with countershaft gear sets is accounted for through axial displacement of the countershafts. This allows equilibrium to be found and even torque transfer without radial displacement of the main shaft gears. This allows gear synchronizers to be implemented without misalignment issues and higher wear rates exhibited with radially adjusting transmission main shafts. The total axial force of each countershaft subassembly at each gear can be designed to be counteracted totally or partially based on selecting proper helical gear angle and other gear parameters in conjunction with the axial displacement of the countershaft.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A change-gear transmission, comprising:
    an input shaft receiving rotational input, said input shaft having at least one input shaft gear;
    a main shaft for delivering rotational output, said main shaft having at least one main shaft gear, at least two selectable gears, and gear synchronizers between each of said at least two selectable gears;
    at least one intermediate countershaft having a driven gear and at least one driving gear affixed thereto;
    said at least one input shaft gear meshing with at least one driven countershaft gear;
    said at least one intermediate countershaft being supported radially and free to displace axially based loads from said at least one input shaft gear and said at least one driven countershaft gear meshing;
    said at least one driven countershaft gear meshing with said at least one main shaft gear for outputting a countershaft rotation.

2. The change-gear transmission of claim 1, wherein bores of said at least one main shaft gears have a very small radial clearance fit with mating parts to prevent gear synchronizer wear and deterioration.

3. The change-gear transmission of claim 1, wherein said at least one intermediate countershaft further comprises at least two countershafts;
    said at least two countershafts receiving substantially equal load from said at least one input shaft gear via an axial displacement of said at least two countershafts.

4. The change-gear transmission of claim 1, wherein said at least one driven countershaft gear is supported by at least two bearing elements; and
    said least one driven countershaft gear can be moved axially in fore and aft directions between said at least two bearing elements.

5. The change-gear transmission of claim 1, wherein each of said at least one input shaft gear, said at least one main shaft gear, said driven gear, said at least one driving gear, and said at least one driven countershaft gear comprise helical gears.

6. A change-gear transmission, comprising:
    an input shaft receiving rotational input, said input shaft having at least one input shaft gear;
    a main shaft for delivering rotational output, said main shaft having at least one main shaft gear;
    said main shaft connecting to an auxiliary gear range change section;
    said auxiliary gear range change section having at least one axially adjustable intermediate countershaft connecting to an output shaft;
    said at least one axially adjustable intermediate countershaft having a driven gear and at least one driving gear affixed thereto;
    said at least one input shaft gear meshing with at least one driven countershaft gear;
    said at least one axially adjustable intermediate countershaft being supported radially and free to displace axially based loads from said at least one input shaft gear and said at least one driven countershaft gear meshing;
    said at least one driven countershaft gear meshing with said at least one main shaft gear for outputting a countershaft rotation.

7. The change-gear transmission of claim 6, wherein said at least one axially adjustable intermediate countershaft further comprises at least two countershafts;
    said at least two countershafts receiving substantially equal load from said at least one input shaft gear via an axial displacement of said at least two countershafts.

8. The change-gear transmission of claim 6, wherein said at least one driven countershaft gear is supported by at least two bearing elements; and
    said least one driven countershaft gear can be moved axially in fore and aft directions between said at least two bearing elements.

9. The change-gear transmission of claim 6, wherein each of said at least one input shaft gear, said at least one main shaft gear, said driven gear, said at least one driving gear, and said at least one driven countershaft gear comprise helical gears.

* * * * *